(12) United States Patent
Montague (10) Patent No.: US 6,954,731 B1
(45) Date of Patent: Oct. 11, 2005

(54) METHODS AND SYSTEM FOR OPTIMIZING A CAMPAIGN

(75) Inventor: John E. Montague, Columbia, SC (US)

(73) Assignee: NCR Corporation, Dayton, OH (US)

(*) Notice: Subject to any disclaimer, the term of this patent is extended or adjusted under 35 U.S.C. 154(b) by 277 days.

(21) Appl. No.: 09/604,503

(22) Filed: Jun. 27, 2000

(51) Int. Cl.[7] .................................... G06F 17/60

(52) U.S. Cl. ............................... 705/10; 705/14

(58) Field of Search ............... 707/5, 6, 12, 3, 707/102; 706/12; 705/10, 1, 8, 9, 14

(56) References Cited

U.S. PATENT DOCUMENTS

| | | | |
|---|---|---|---|
| 5,321,833 A | 6/1994 | Chang et al. | |
| 5,436,965 A | 7/1995 | Grossman et al. | |
| 5,812,642 A | 9/1998 | Leroy | |
| 5,854,923 A | 12/1998 | Dockter et al. | |
| 5,873,068 A | 2/1999 | Beaumont et al. | |
| 5,889,799 A | 3/1999 | Grossman et al. | |
| 5,898,762 A | 4/1999 | Katz | |
| 5,966,695 A * | 10/1999 | Melchione et al. | 705/10 |
| 5,974,412 A * | 10/1999 | Hazlehurst et al. | 707/3 |
| 6,236,977 B1 * | 5/2001 | Verba et al. | 705/10 |
| 6,240,411 B1 * | 5/2001 | Thearling | 707/5 |
| 6,289,353 B1 * | 9/2001 | Hazlehurst et al. | 707/102 |

FOREIGN PATENT DOCUMENTS

| | | | | |
|---|---|---|---|---|
| WO | WO0041119 A1 * | 7/1999 | | G06F 19/00 |
| WO | WO9946719 A1 * | 9/1999 | | G06F 19/00 |

OTHER PUBLICATIONS

Oncontact Software Corporate Web Site at <www.oncontact.com>.*
MarketingPilot Corporate Web Site at <www.marketingpilot.com>.*
Barron's Dictionary of Marketing Terms, 1994—Definition of a marketing or advertising 'campaign'.*
Webster's Third New International Dictionary, 1961—Definition of a 'campaign'.*
SAS Software product at www.sas.com archived on May 2, 2000.*
Cambridge Dictionary of Statistics, 2002, Definition of time series.*

* cited by examiner

Primary Examiner—Romain Jeanty
(74) Attorney, Agent, or Firm—Schwegman, Lundberg, Woessner & Kluth, P.A.

(57) ABSTRACT

Methods and a system of optimizing campaigns are provided. A campaign is identified and associated with a campaign contact list. Moreover, factors which indicate whether a contact during the campaign is a business success or a failure are provided. Further, each contact is associated with one or more demographic attributes. Each completed contact is maintained in a completed contact list and determined to be associated with the success factor or the failure factor of the campaign. A correlation is determined based on at least one of the success factor or the failure factor and one or more of the demographic attributes. A remaining contact list including non completed contacts from the campaign contact list may be sorted based on the determined correlation or logically retrieved and provided to a Call Service Representative.

20 Claims, 4 Drawing Sheets

METHODS AND SYSTEM FOR OPTIMIZING A CAMPAIGN

FIELD OF THE INVENTION

The present invention relates to methods and a system for optimizing campaigns while the campaign is in the operation environment.

BACKGROUND OF THE INVENTION

Outbound contact campaigns exist over a variety of channels such as e-mail, facsimile, regular postal mail, telephonic communication, and the like. By and large, telephonic communication is still the most popular and widely preferred contact campaign channel used by businesses to reach consumers.

Typically, a selling business will identify a service or a product which it desires to market to consumers. Next, a market/business analyst will identify individuals which are believed to be likely candidates for purchasing the service or the product. The individual names and telephone numbers of these identified consumers are acquired from a variety of sources such as organizations external to the selling business which compile and sell large amounts of information about consumers, internal customer data stores controlled by the selling business, and the like.

Often analysts will mine a plurality of data stores using a variety of existing automated tools (e.g. NCR's Relationship Optimizer, and the like) in order to define appropriate profiles on potential purchasers and to correspondingly restrict the contact campaign to the potential purchasers matching the profiles. Some data stores consist of historical information gathered from past campaigns and historical customer information collected during past interactions of all types with the customer (like prior purchases, credit applications, service information, and others). However, this mining exercise only creates a target list of consumers whom will be contacted during the campaign, and it does not optimize the actual execution of the campaign.

After a campaign is identified and a contact list created, a variety of existing automated software packages permit the campaign to be automatically managed, placing calls to the target consumer and connecting the call (after the consumer answers) to the next available call center agent (also referred to as a customer service representative "CSR"). For example, the contact list can be electronically provided to Computer Telephony Integration (CTI) software packages (e.g. Genesys, Geotel, and the like) wherein a record for each contact is maintained electronically and logically hooked to a customer database where additional information about a contacted consumer may be acquired and provided to the CSR during the contact with the consumer.

Furthermore, these CTI packages may be interfaced to a variety of internal business Front Office Applications (FOA), such as Vantive, SilkNet, Siebel, ONYX, and Clarify. The FOA's permit modification to fields in the internal customer database, and electronic screens are popped up on a CSR display when a call is delivered to a CSR, providing additional information to the CSR about the contact. CTI's do not require CSR's to dial any telephone number, this is all handled by the package automatically.

It is well known by those skilled in the art that various environmental factors, such as time of day, time of week, current events, consumer obligations, and consumer activities, and the like will have a significant impact on whether or not a contacted consumer in the campaign will be receptive to the CSR's offered services and/or products. Yet, existing outbound contact campaigns do not provide methods or systems which enable the campaign execution system to select target customers who are likely to be receptive at the time the call is placed while traversing the contact list. Since, ideally the selected contact list is already optimized prior to the campaign with the appropriate consumers, it is desirable to continuously optimize the order in which the contact list is traversed during the campaign such that the consumers are contacted at appropriate times where their individual environmental factors are most favorable to permitting a successful CSR contact (e.g. a sale, a trial offer, and the like).

Moreover, by contacting consumers at a time which is conducive to their individual favorable environmental factors, the CSR does not waste his/her time talking to individuals predisposed to rejecting a telemarketing call and therefore more successes are recorded during the campaign. More successes translate into potentially more revenues for the selling business. A typical call center (e.g., 50 agents) may realize over $100,000 per year in savings by reducing each contact by 20 seconds, a savings typically realized by enabling a call center with CTI and FOA software. Increasing the number of customer contacts by one each hour, which achieves the business success for which the campaign was undertaken, typically improves the CSR's productive time by 6 minutes each hour. Therefore, as one skilled in the art will appreciate, the ability to only marginally increase the success rate of a campaign can have a significant impact on the selling business by increasing revenues while decreasing the expenses associated with CSR's.

SUMMARY OF THE INVENTION

Accordingly, an object of the invention is to provide methods and a system of optimizing campaigns. By augmenting existing campaign management systems to include conditional expressions operative to automatically determine whether a contact made during the campaign is a business success and to include demographic attributes associated with the contacts, a standard statistical correlation for the campaign may be established. The correlation may be used to evaluate the non completed contacts within the campaign and to sort the contacts in an order which is statistically more conducive for success. Moreover, the correlation is modified at different adjustable time intervals, to continuously reorder the non completed contacts such that each contact is made at the most optimal statistically determined time during the campaign.

Additional objectives, advantages and novel features of the invention will be set forth in the description that follows and, in part, will become apparent to those skilled in the art upon examining or practicing the invention. The objects and advantages of the invention may be realized and obtained by means of the instrumentalities and combinations particularly pointed out in the appended claims. To achieve the foregoing and other objects and in accordance with the purpose of the present invention, methods and a system of optimizing campaigns are provided.

A method of optimizing a campaign using a set of executable instructions is provided, comprising receiving a campaign operative to determine a success factor and a failure factor, and a contact list which includes a plurality of contacts, each contact associated with one or more demographic attributes. Further, a completed contact list is associated with each completed contact in the contact list and a remaining contact list is associated with each non completed contact in the contact list. A success or failure factor is associated with each completed contact in the completed contact list and a correlation is determined from the completed contact list between completed contacts associated with the factors and one or more of the demographic attributes. Moreover, each contact in the remaining contact list is retrieved, or selected in a desirable order, based on the determined correlation.

Further, a system of optimizing campaigns is provided comprising a campaign optimizer having executable instructions operable to communicate with one or more data stores, each data store having at least one of completed contacts and non-completed contacts, the campaign optimizer operable to receive completed contacts at adjustable time intervals. Additionally, a correlator is provided having executable instructions operable to communicate with the campaign optimizer and to receive the completed contacts, and operable to determine if a correlation associated with the completed contacts exist between the completed contacts identified as at least one of a success factor and a failure factor and one or more demographic attributes associated with the completed contacts. Also, a non completed contact sorter having executable instructions is provided operable to communicate with the correlator, one of more of the data stores, and the campaign optimizer, the non completed contacts sorter operable to sort, or select in a desired order, non completed contacts in one or more of the data stores based on the correlation.

Lastly, a method of optimizing a contact list during a campaign using a set of executable instructions is provided, comprising identifying a contact campaign, receiving a contact list including completed contacts and non completed contacts, each of the contacts associated with a success factor, a failure factor, and one or more demographic attributes. Furthermore, at adjustable intervals during the contact campaign a correlation is determined between the factors and one or more of the demographic attributes of the completed contacts. Moreover, execution of the non completed contacts are reordered during the contact campaign based on the correlation.

Still other aspects of the present invention will become apparent to those skilled in the art from the following description of an exemplary embodiment, which is by way of illustration, one of the best modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings.

DETAILED DESCRIPTION

The present invention provides methods a system for optimizing campaigns. One embodiment of the present invention is implemented using NCR's Relationship Optimizer for the FOA, a customer data store housed in NCR's Teradata database, an CTI application using Genesys, and the methods and system written in C++ and Visual Basic programming languages. The operating system environment is both WINDOWS NT and Unix. Of course other FOA's, data stores, CTI's, programming languages, and operating systems (now known or hereafter developed) may also be readily employed. Moreover, as one skilled in the art will readily appreciate the client operating system environment may differ from the server operating system environment, and each of the various architectural components may have their own operating system environment.

Initially, a business identifies a campaign (e.g. sell more of product x, sell service y, acquire more subscriptions to trial offer z, and the like) and an analyst creates a campaign contact list, although as one skilled in the art will appreciate no analyst may be needed at all, as automated software programs, and other methods may acquire the initial campaign contact list. Identifying how a campaign contact may be determined a success or failure may be self-evident at the close of a contact, in which case conditional expressions may be automatically evaluated to determine the success or failure of the completed contact. However, if a conditional expression is not deployed or not capable of being deployed given the complexity associated with determining whether a particular contact was a success or failure, automated screens may be popped to a CSR's desktop upon completion of a contact where a selection will need to be made by the CSR, the selection operative to permit automated determination as to whether the contact was a success or a failure.

As previously discussed a CTI package, such as Genesys by way of example only, will receive a campaign contact list and in the normal course will proceed to make automated telephonic contact with each individual in the contact list. Genesys, and others, permit some interfacing to FOA's (e.g. Vantive, and others) which hook to a businesses internal data stores (e.g. NCR's Teradata, and others). CTI packages often provided an application programming interface (API) where a business may augment the contact records associated with a contact to include data store fields associated with internal data stores. Even if the CTI package does not support the preferred data store of the business, standard data stores (e.g. Oracle, MS SQL, Informix, Sybase, DB2, and others) are often supported, interfacing to the non-supported data store is easily accomplished with any ODBC (Open Database Connectivity) connection using ANSI SQL queries.

Augmentation of the CTI's contact record may be achieved, by way of example only, by adding the following additional fields to the call record:

Success: Boolean
Failure: Boolean
Skip: Boolean
Non-sort: Boolean
Predicted-success: Floating/Integer/Boolean
Tables: String Where the newly added field for the Success column is used to identify a successful contact and the Failure column identifies a failed contact. Success and failure conditions are evaluated by conditional expressions, or by manual indications made by the CSR via automated display screens popped to the CSR's display screen (discussed below). The Skip column is added to identify a particular contact record where a success or failure condition could not be ascertained and is used by the success correlator (discussed below). The Non-sort column is added to be used by a sorter set of executable instructions (discussed below). Predicted-success column is also used by the sorter (discussed below). The Tables column will contain a variable length string which identifies the table and column names associated with fields in one or more data stores where one or more demographic attributes associated with a particular contact may be acquired. The CTI package will provide a contact id which is operative to uniquely locate from one or more data stores the column values associated with the column names of the Tables column. Demographic attributes include, by way of example only, such things as age, occupation, address, city, state, gender, size of family, income, ethnic origin, and others.

Once the CTI package is augmented with the above additional columns in the contact record, a global record maintained by a campaign optimizer set of executable instructions may be used to optimize each campaign. The campaign optimizer may be singly deployed for a plurality of campaigns being simultaneously managed and optimized, each campaign uniquely managed by a single global record with the following fields, by way of example only:

Campaign-id: Integer
Success-vars: String
Failure-vars String
Interval: Integer
Dem-vars: String Where the. Campaign-id identifies uniquely the campaign being managed, this is the primary key used to access the global campaign record. The Success-vars and Failure-vars are varying length strings which are used by a success analyzer set of executable instructions to evaluate whether a contact made is a business success or a failure. The string information embedded in these fields may be provided by an analyst equipped with an appropriate API which will translate the various conditions into computer readable and computer evaluatable conditional expressions or automated dialogue boxes for the CSR to manually identify successes or failures. These two fields each contain a string representing a conditional statement which is itself comprised of multiple boolean expressions connected by AND or OR logical connectors (which have equal precedence, the statement being evaluated left to right). Each boolean expression relates constants and/or variables with any of the standard boolean operators (like =, <, >, <=, >=, <>) to obtain a boolean answer (True, False)). There are two types of variables: TABLE variables, those obtained from database tables, and DIALOG variables, values obtained from a CSR's response to a pop-up dialog box. Variables are defined with the following fields:

Type: String ("TABLE", DIALOG")
Customer-key: Integer
TABLE: Location String (Server+database+table+column names)
TABLE: Var. Type String ("Integer", "String", and others)
DIALOG: Box Info multiple strings to define query & responses Where the Type field holds a string value of either "Table" or "Dialogue." A "Table" value indicates that the variable must be fetched from a database table identified by the Location information (specifying all location information down to a data store table and column) in a row identified by using the Customer-key (e.g. passed by the CTI package as contact-id). A "Dialog" value indicates that the variable value is to be determined by the CSR's choice of a response in a dialog box constructed from the Dialog Info. The Success Analyzer parses the Dialog Info into a dialog box containing a query and two or more mutually exclusive responses. The result is a number. The CSR will not be able to proceed to the next contact until the dialogue window(s) is(are) addressed. In this way, a manual determination of success or failure may be identified by an automatically constructed dialogue window and used by the success analyzer. Although as one skilled in the art will appreciate, a variety of different techniques my be employed to achieve a CSR driven determination of a contact's success or failure.

In this way, the Success and Failure fields of the global campaign record are evaluated by the success analyzer set of executable instructions yielding a True or False result for the just completed contact. This result may be derived from one or more table values (like the amount of the order taken during the contact) or one or more dialog box results or a mixture of both.

As described above, the Success and Failure fields of the global campaign record may be used by the success analyzer at the close of each contact to either automatically determine success or failure or to manually (although in an automated fashion) permit the CSR to select an option via a dialogue window wherein success or failure may be determined. Once the success analyzer determines success or failure the augmented contact record being maintained by the CTI package may be modified so that either the Success or Failure boolean columns have their values set to either "1" for true or "0" for false as is appropriate. Moreover, once the contact record is identified as either a success or a failure it is correspondingly known to have been a completed contact.

Continuing with the description of the fields associated with the global campaign record, the Interval column is used by an optimization manager set of executable instructions to determine how often a correlator set of executable instructions should be initiated, described below. Furthermore, the optimization manager may alter this interval period if the success ratio per interval associated with the campaign is not improving sufficiently well enough. For example, if the Interval field value for a campaign is initially set to 15 (an indication that the interval is 15 minutes) and the optimization manager detects that the success ratio for the interval periods (contacts in the interval identified as success versus the total number of contacts during the interval) are not improving (e.g. remaining at 25%), then the optimization manager may switch the period within which a success correlation is to be determined from 15 to 30. In this way, the optimization manager is capable of automatically determining the optimal level within which a success correlation is to be determined.

Finally, the Dem-vars column is comprised of a series of fields which identify the demographic attributes associated with the contacts of the campaign, these fields are similar to the variable definitions in the Success and Failure sub-fields, as described above, but will have Type values of "Table," additionally, a count field is provided since the Dem-vars are one to many demographic attributes, the count field permits parsing of the Dem-vars string for each individual demographic attribute.

With the above discussion examples depicting one embodiment, of a structure and a layout of the present invention as a foundation, the methods and system of the present invention will be discussed.

Figure 1:
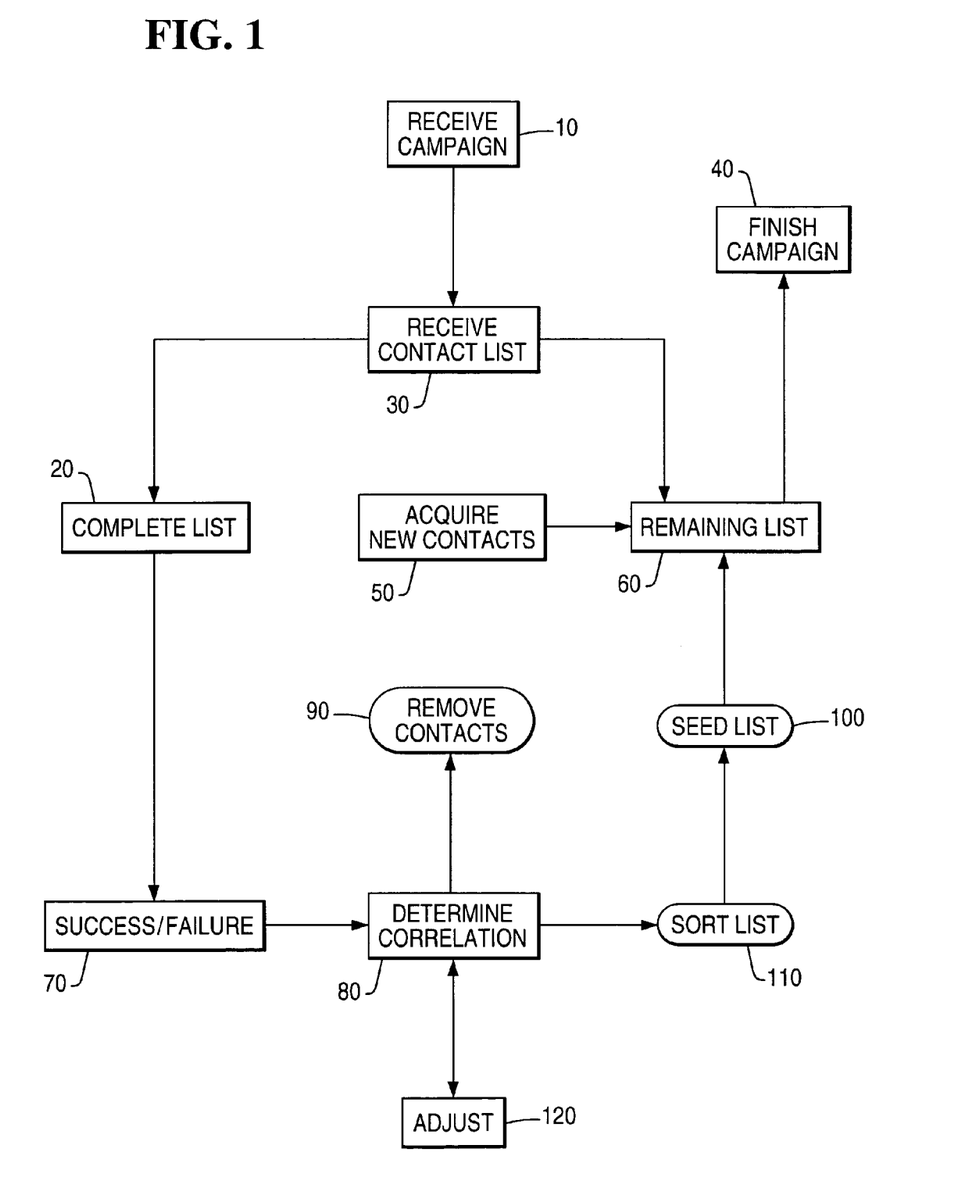
FIG. 1 depicts a flow diagram of a method of optimizing a campaign.

FIG. 1 illustrates a flow diagram of one embodiment of a method for optimizing a campaign. In step 10 a campaign is received, the campaign is associated with, by way of example only, a contact list (managed within a CTI package), and conditional expressions or text which are operable to be embodied in a computer readable medium which when evaluated may determine whether a particular contact within the contact list may be associated with a campaign success or a campaign failure.

As discussed above, the CTI package is augmented using the existing CTI's API so that additional fields of a contact record associated with each contact within the campaign includes a success field and a failure field. Moreover, a campaign optimizer for managing one to many campaigns maintains information for each campaign, and is capable of identifying each campaign uniquely by a campaign id. Typically, the CTI package will provide the campaign id for each contact list being used within a campaign. However, as one skilled in the art will appreciate it is possible to augment the CTI contact record so as to include an additional field where the campaign id is hardcoded. In this way, the campaign optimizer is capable of identifying and receiving the campaign and the contact list (step 30). Individual contacts will have provided CTI contact ids which correspond to customer ids and permit access to the appropriate data store records where necessary.

Moreover, the CTI contact records are augmented to include a field which permits one to many demographic attributes associated with a contact to be directly associated with the contact (discussed above). Again, any particular contact may have its demographic variables referenced by using the contact id as a key along with the fields parsed from the Tables field which augments the contact record. Any demographic attributes which are to be used to determine a success or failure condition for the campaign will need to have non null values, if a particular contact has a null value for a demographic attribute associated with a success or failure condition or if any other anomalous condition precludes grading a contact as a success or failure, then the augmented field of the contact record identified as Skip is set to "1" or true. In this way, records which contain these types of error conditions will not be evaluated for purposes of determining any correlation associated with the demographic attributes.

Once a CSR completes a contact, the contact may be logically assigned to a list associated with completed contacts (step 20) and before the CSR may continue to the next contact within the contact list (remaining list, step 40), a trap is raised and the success analyzer is called. Further, the campaign optimizer's unique campaign information includes Success and Failure fields which are associated with the campaign (discussed above). These fields are retrieved by the success analyzer at the completion of each contact within the campaign and the conditional expression evaluated in light of the values associated with the referenced demographic attributes. Once a determination is made as to success or failure, the appropriate value of the contact record is set (step 70). Further, if a conditional expression is not available but, rather, the success or failure is to be determined by the CSR using a dialogue window, then the appropriate dialogue box is popped on the CSR's desktop and a selection made (process discussed above). After the selection, the appropriate value of the contact record is set for success or failure (step 70).

The success analyzer has access to the contact record via the campaign id and the contact id where modification to the augmented records may be readily made. Once success or failure is determined, the campaign optimizer checks the campaign interval field to determine if a new interval has occurred. If an interval has expired the campaign optimizer passes to the optimization manager the current interval field value along with a sequential interval number. The optimization manager maintains information relating to the campaign's intervals and records, associated with previous success ratios from prior intervals. Moreover, the optimization manager initiates a call to the correlator and the sorter.

At the end of an interval period, the optimization manager calls the correlator.

The correlator will process all records in the completed contact list which were completed during the last interval period. By way of example only, processing only contact records which were completed during the last interval may be accomplished by having the optimization manager pass to the correlator the sequential interval number and the ID of the last contact record processed, the correlator then simply scans up the list marking each contact record with the sequential interval number until it detects a contact record which already has an interval number (indicating that contact record begins a previous interval which has been previously processed).

Next, the correlator (step 80) will proceed to process the contact records identified as completed and belonging to the current interval. Records with a skip flag set are not processed, similarly records with no success or failure flag set are not processed. Having, identified only those contact records which need to be used to have a correlation established, the correlator proceeds to process the set of contact record's from the just completed time interval, mathematically correlating each individual demographic attribute against either the success fields or the failure fields from the call records. Each correlation derives a correlation coefficient for the demographic being evaluated. The correlation coefficient is a number between 0 and 1. When the correlation coefficient is greater than some threshold (for example 0.65) it is deemed to be significant. There may be more than one significant correlation in which case each significant demographic is given a weight associated with predicative value of success for that particular demographic. The weight is a decimal number from 0 to 1 with the sum of all weighting factors equaling 1. The correlation process also determines the range of values the demographic must have to be significant. Although as one skilled in the art will appreciate, the particular weighting factor for any demographic attribute being compared against either the success or failure fields may take on a range of values depending upon the campaign and decisions of a business analyst and correspondingly what determines a significant weighting factor is adjustable and modifiable and may be provided to the correlator so as to be configurable.

Determining the statistical correlation between a series of variables is readily knowable to those skilled in the art, and standard techniques may be deployed to account for discrete variables (e.g. gender) versus continuous variables (e.g. income level), which are associated with the demographic attributes. Moreover, a multi-variance (multi-dimensional) statistical algorithm may be deployed to account for the dependence among all the demographic attributes in relation to the success or failure field, rather, than accounting for each demographic variable in isolation. Upon completion of the correlator, each demographic variable will have a weight associated with it indicating its probability of either being a successful or unsuccessful contact.

The correlation results which include the identity of the demographics which have been found to correlate with success (or failure) together with the value ranges that demographics must have to be predictors of success (or failure) and the weighting factor for each demographic are passed to the campaign list sorter via the campaign optimizer manager. The list sorter then uses this information to find call records that predict to be successes.

Once the correlator is completed the optimization manager receives a total number of completed records processed along with the number of successful records and then uses this information to assign a success ratio to the current interval being evaluated. As previously stated, the optimization manager may check the various success ratios with prior intervals and determine that an interval length change needs to be made, or the optimization manager may detect that the highest correlation weighting factor associated with any one demographic attribute is not significant (this is configurable), if this occurs the interval length is adjusted by the optimization manager by modifying the Interval field for this particular campaign (using the campaign id) in the campaign optimizer. This modification to the interval length will result in an automatic adjustment (step 120) to the correlation upon the next call to the correlator.

Next, the sorter is called receiving the contact list, the demographic weighting factors, significant demographic identities and the value ranges they should have, and the interval length acquired from the campaign optimizer. Also, the sorter will be passed the number of records needed to accommodate calls that are needed to fill the next optimization interval. Further, the sorter will receive an adjustable and configurable number which is indicative of a percentage of contact records which are to be sorted into the remaining contact list (e.g. those contacts not yet processed by the correlator or without a skip flag set) without regard for the demographic weighting factors determined by the correlator. This sorting of the remaining contacts without regard to the correlation is referred to as seeding the remaining contact list, step 100. This ensures that some contacts made during the next interval period by the CSR are to contacts which are randomly placed before the CSR and not predetermined by sorting the list based on the correlation weighting factors (step 110).

In this way, the sorter, ensures that the correlator is able to detect during its next cycle new patterns or correlations occurring during the campaign. Moreover, any contact which was determined to be seeded randomly, will have its no sort flag set, in this way a standard statistical algorithm deployed in the correlator may give a higher weighted factor to demographics associated with non sort records, thereby, permitting the correlator to detect environmental changes occurring during execution of the contact campaign list. For example, if during the first interval of the campaign a correlation factor for a demographic attribute of gender was determined to be statistically significant in that no males were successful contacts and 30% of the females contacted were successful. Then, assuming an environmental change occurs outside the scope of the campaign, for example, the super bowl ends, if in the next interval a certain percentage of men were not randomly seeded into the remaining contact list for the CSR to contact, the system would not detect that in fact men were now likely to be successful contacts. In this way, the contact list is continuously improved and modified so that individuals are contacted at times which they are most likely to be receptive to the contact campaign. The seeding of the remaining contact list with random contacts without regard to the determined demographic correlation will also result in an adjustment to the correlations (step 120) during the next interval calculation.

By way of example only, the sorter may randomly seed the remaining contact list by maintaining a counter which is initially set to 0, each time a contact is bubbled to the top of the remaining list, because it has a significant demographic correlation associated with one of its demographic attributes, the counter is incremented. Once the counter reaches a set number (percentage which is configurable and adjustable), the current record being processed in the remaining contact list is bubbled to the top of the list. This bubble sort algorithm is one of many sorting algorithms well known to those skilled in the art, and a variety of other sorting techniques both standard and ad hoc may be developed to randomly seed and sort the list.

Finally, the sorter is configured to know the number of calls which a CSR may make in a certain time interval and correspondingly only sorts and seeds the appropriate number of contacts to the top of the remaining contact list for a given interval length. This number is calculated using recent operational statistics obtained from the CTI system. Further, any sorted remaining contact has its Predicted-success field set to a boolean value such as true where initially all contacts have a Predicted-success field value of false. Although, the average weighted correlation factors for each remaining contact in the contact list may be written to the contact records Predicted-success field as a percentage value as opposed to a boolean value. Moreover, it may be desirable to remove contacts all together from the contact list based on extremely low correlation values, this may be done in step 90. Likewise, contacts not originally in the list could be mined from the data stores using the correlation value to acquire new contacts not originally associated with the contact list in step 50.

Further, as one skilled in the art will appreciate, the correlator could after determining the correlations insert a Predicted-success value for each of the remaining contacts in the remaining contact list and in this case the sorter would simply sort on the Predic-success field of the remaining contact records and randomly sort records without regard to the Predicted-success value.

Moreover, as one skilled in the art will appreciate, no sort is needed at all since standard database queries using the Predict-success field and other fields could retrieve for a CSR records identified as potential successes without the need to actually alter the remaining contact list. By way of example only, the correlator could alter the Predict-success field and a database query could search the contact list for remaining contacts with the Predict-success field set to "1" or true, then only the number of calls which a CSR could handle during the next interval are provided to the CSR. Further, no Predict-success field is needed at all, since the demographic and their relationship to success or failure could be directly provided in a database query which is tasked for retrieving contacts which are potential successes. In this way, the contact list is not altered at all but, rather, logically provided to the CSR in an ordered manner.

Logging information about each interval may be tracked and recorded, such that a reporter set of executable instructions may read each interval along with the success ratio associated therewith and produce a graphic user interface (GUI) display for business analysts to review or monitor, such that manual interval modification could be interjected by an analyst who is detecting trends visually on a GUI presented graph. Various information could be presented such as, by way of example only, predicted success rates versus actual success rates per interval, multiple windows displaying simultaneously occurring campaigns, and the like. Moreover, third party report generators could be provided the logging information and, thereby, generating customized reports (e.g. Acuate, Crystal Reports, and others). Reports displayed visually on a display screen may also be printed in a hard copy format.

Figure 2:
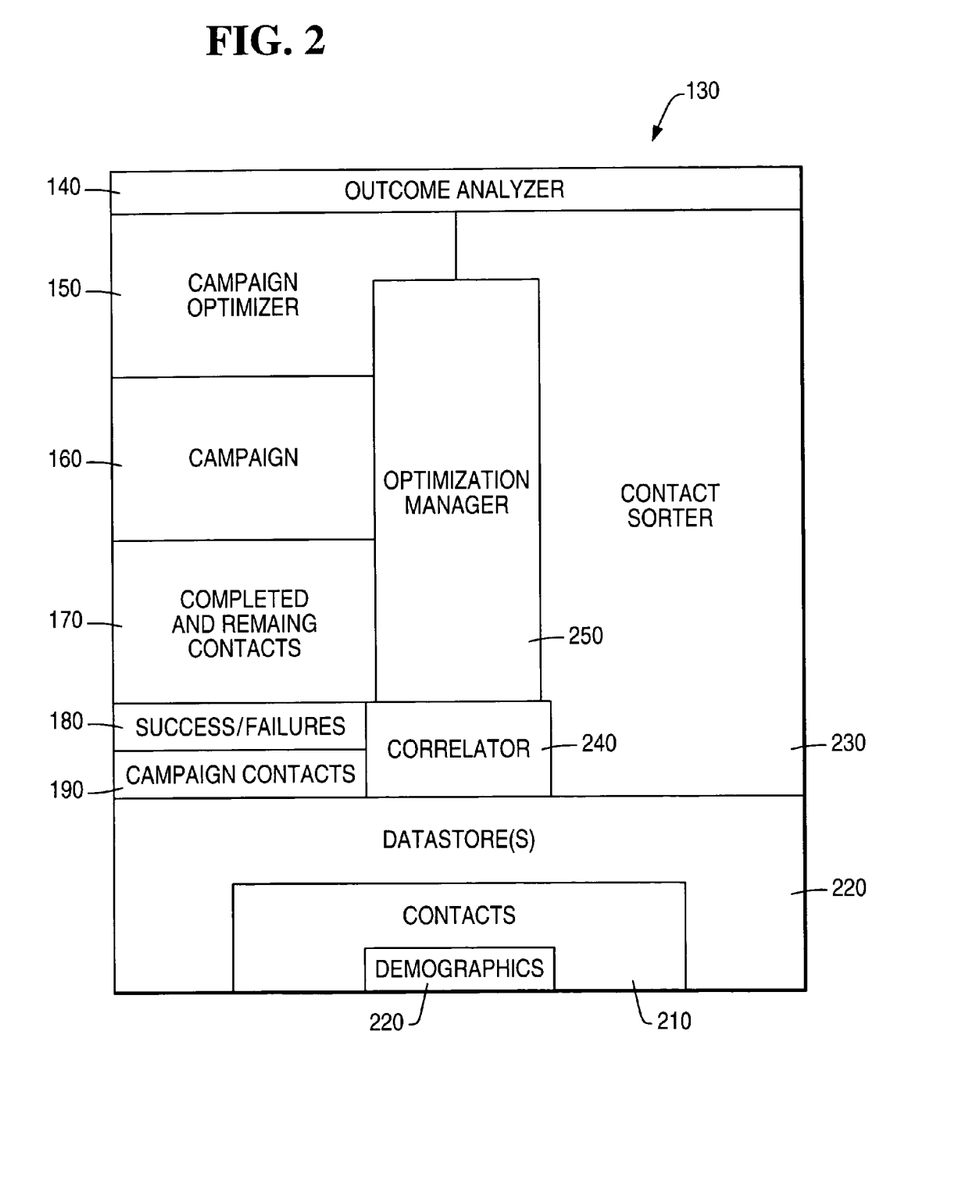
FIG. 2 depicts a block diagram of a system for optimizing a campaign.

FIG. 2 illustrates one embodiment of a system 130 for optimizing a campaign. Architecturally, a single contact campaign may be optimized, by way of example only, the system 130 depicted in FIG. 2. Although, as one skilled in the art will appreciate alternative structures are possible without departing from the invention herein disclosed.

Each campaign 160 is comprised of completed and remaining contacts 170 with each contact being identified, at some point during the campaign 160, as a success or a failure 180. Identifying completed and remaining contacts may be accomplished logically by flagging contact records with the appropriate values for fields contained within the record, as discussed above. A campaign success identification and a campaign failure identification, may be made upon the completion of the contact via an automated evaluation of a conditional expression or via automated screen dialogue boxes presented to the CSR for manual resolution, as discussed above. Information regarding the campaign being managed and the success and/or failure evaluation is managed by a campaign optimizer 150. Individual contact success or failure evaluations is determined by an outcome analyzer 140. Moreover, a single instance of a campaign optimizer 150 may be used to manage more than one campaign 160.

Contacts 210 are acquired from one or more data stores 200 wherein each contact is associated with one or more demographic attributes 220. A particular campaign 160 is associated with a subset of all available contacts 210 and identified as campaign contacts 190. As one skilled in the art will appreciate, a single contact may be associated with one to many demographic attributes 220 were each attribute originates from one to many different data stores 200. Access to the information contained in the data stores is achieved using standard data store queries, where a contact id and a campaign id provide primary access to desired records, as previously presented. By way of example only, standard CTI packages are augmented so that contact records associated with a campaign are associated with one or more demographic attributes 220.

At configurable intervals, an optimization manager 250 will initiate a correlator 240 wherein completed records are evaluated. Completed contacts 170 associated with the campaign contacts 190 which have been flagged as a success or a failure 180 are evaluated using standard statistical methods well known in the industry against demographic attributes 220 to establish success or failure correlations. Selection of the statistical computation is based upon whether the demographic attribute is associated with a discrete (distinct) versus a continuous (indistinct) variable. Moreover, the relationship between success or failure may be accomplished so as to determine the dependency among all the demographic attributes 220 by using multi-variance statistical computations, also well known in the art.

Once a success or failure correlation is established, a contact sorter 230 is initiated by the optimization manager 250. The contact sorter 230 receives a configurable interval period associated with the campaign optimizer 150 which identifies the interval length within which correlations are currently being made. Moreover, the contact sorter 230 is configured to know how many contacts a CSR may handle in a given interval. Further, the contact sorter 230 may be configured to determine a significant weighting factor and a seeding factor.

Once initiated or provided access to the above information, the contact sorter 230 proceeds to sort contact records into the CSR's remaining contact list 170 for the next integral contact period, contact records identified as potential successes by using the correlation established by the correlator 240. Moreover, some records will be sorted in the next interval period without regard to the correlation determined by the correlator 240.

As previously discussed, this seeding of the remaining contact list will ensure automatic adjustment to the correlation determined by the correlator 240 in the next interval period of the campaign 160. In this way, contacts are contacted by a CSR at time periods within which they are more statistically likely to positively receive any sale's pitch or promotional offer being conveyed by the CSR.

Figure 3:
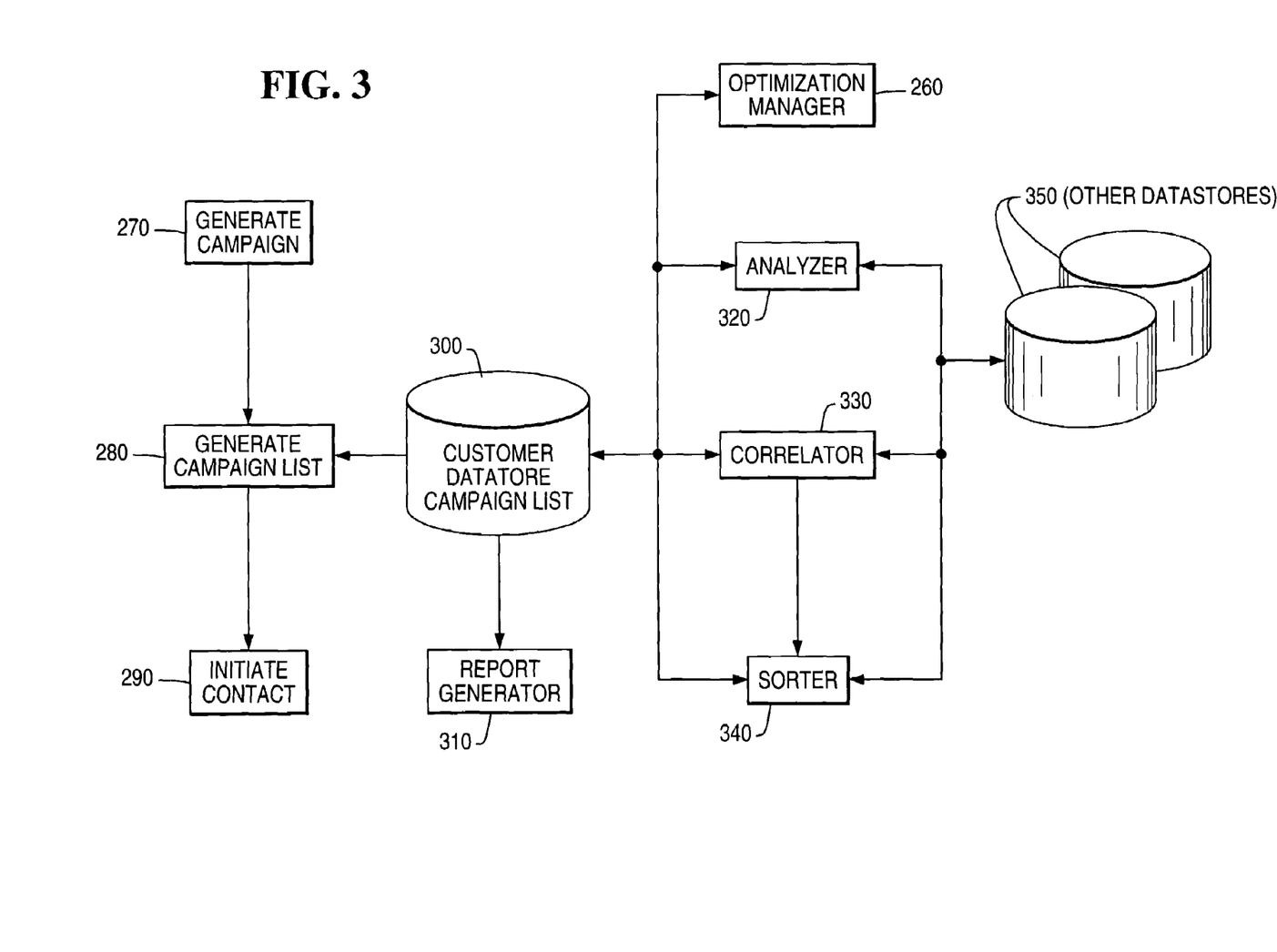
FIG. 3 depicts a flow diagram of a system for optimizing a campaign.

FIG. 3 illustrates another embodiment of a system for optimizing a campaign. In FIG. 3 a campaign is initially generated in step 270 and a campaign list acquired in step 280 from one or more data stores 300. Next, a CTI package provides for managing individual contacts in the campaign list in step 290. Once a CSR completes a contact a trap is raised causing an analyzer 320 to evaluate the completed contact to determine if the contact was a success or a failure. The success or failure of the completed contact is recorded with the contact record.

At configurable intervals, an optimization manger 260 initiates the calling of a correlator 330 where completed contacts in the contact list are evaluated using standard statistical correlation which determine correlations between a contact's success or failure and each of a contact's associated demographic attributes, as previously discussed. Further, the optimization manager 260 initiates a sorter 340 upon completion of the correlator 330 wherein the remaining contacts which are to be presented to the CSR during the next campaign interval are sorted based upon any correlation determined by the correlator 330. A configurable percentage of records presented in the next campaign interval will be sorted without regard to the correlation determined so as to identify in the next determined interval period changes with respect to the correlation which are occurring within the contact population based upon outside environmental factors, as discussed above.

Lastly, additional data stores 350 provided to the analyzer 320, the correlator 330, and the sorter 340, through a standard data interface mechanism, demographics that are not stored in the campaign call list.

Figure 4:
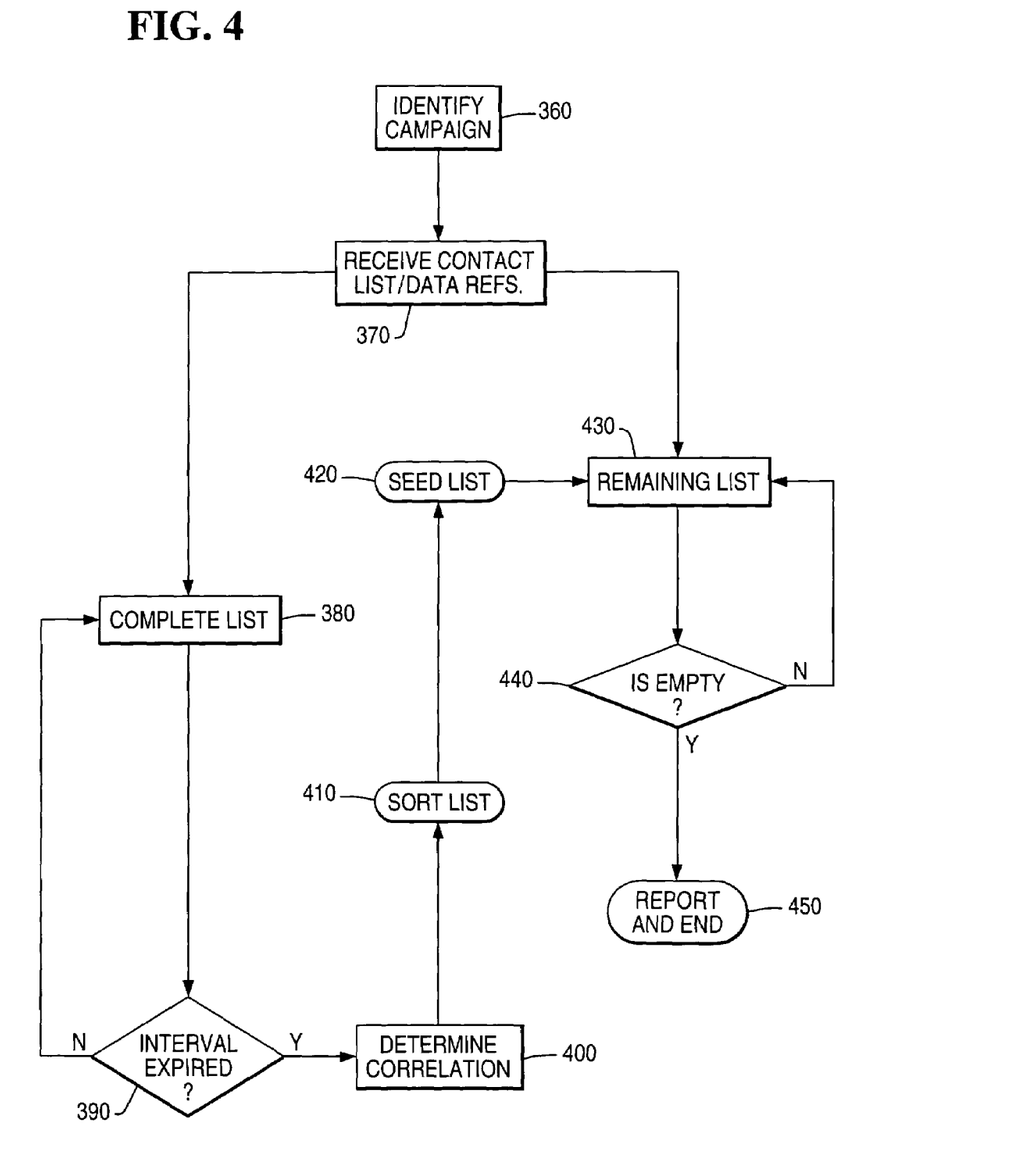
FIG. 4 depicts a flow diagram of a method of optimizing a contact list during a campaign.

FIG. 4 illustrates a flow diagram of one embodiment for a method of optimizing a contact list during a campaign. Initially, a campaign is identified in step 360 and a contact list associated with the campaign is received in step 370, along with data references which permit access to one or more additional data fields associated with each contact in the list. Access to these additional fields is achieved using a contact id and acquired from one or more data stores. Moreover, some of these additional data references identify demographic attributes associated with any particular contact.

As the campaign ensues, completed contacts in the contact list are logically identifiable in step 380 as are remaining contacts in step 430. Each completed contact is determined to either be a successful contact or not. At adjustable intervals, a check is made in step 390 to determine if a correlation is to be established in step 400. Using the data references associated with demographic attributes of the contacts, a standard statistical correlation is determined (step 400), and the remaining contact list is sorted in step 410 and seeded in step 420 with an adjustable percentage of remaining contacts without regard to any predictive success value identified by the demographic attributes.

The remaining contact list is traversed by the CTI software and checked in step 440 to determine if all contacts have been made in the campaign and if all contacts are completed in step 450 the campaign terminates and reports are generated, as appropriate.

The foregoing description of an exemplary embodiment of the invention has been presented for purposes of illustration and description. It is not intended to be exhaustive nor to limit the invention to the precise form disclosed. Many alternatives, modifications, and variations will be apparent to those skilled in the art in light of the above teaching. Accordingly, this invention is intended to embrace all alternatives, modifications, and variations that fall within the spirit and broad scope of the attached claims.

What is claimed is:

1. A computer-implemented method for optimizing a campaign, using said computer to perform the steps comprising:
    receiving a campaign operable to determine a success factor and a failure factor;
    receiving a contact list including a plurality of contacts each contact associated with one or more demographic attributes;
    associating a completed contact list with each completed contact in the contact list and a remaining contact list with each non completed contact in the contact list;
    determining at configurable contact intervals from the completed contact list if a correlation exists between the completed contacts associated with the factors and one or more demographic attributes, wherein the contact intervals represent elapsed periods of time associated with environmental changes occurring outside a scope of the campaign, and wherein the environmental changes effect the correlation during the elapsed periods of time and the environmental changes are related to current events occurring during the campaign, and wherein success of the campaign is used for dynamically modifying the configurable contact intervals;
    retrieving each contact in the remaining contact list based on the determined correlation; and using said determined correlation for optimizing the campaign.

2. The method of claim 1, further comprising:
    removing one or more selective contacts in the remaining contact list based on an unfavorable value of the correlation which is associated with one or more of the selective contacts.

3. The method of claim 1, further comprising:
    initiating at one or more intervals the step for determining the correlation.

4. The method of claim 3, further comprising:
    dynamically adjusting the contact intervals if no substantial correlation is determined.

5. The method of claim 1, further comprising:
    randomly seeding the retrieved remaining contact list with an adjustable percentage of non completed contacts without regard for the determined correlation.

6. The method of claim 5, further comprising:
    redetermining the correlation to discover if as a result of randomly seeding a modified correlation is detected; and
    retrieving each remaining contact in the remaining contact list based on the modified correlation.

7. The method of claim 1, further comprising:
    discarding remaining contacts in the remaining contact list having unfavorable demographics with respect to the determined correlation; and
    acquiring one or more new contacts not originally associated with the contact list, each new contact having favorable demographics with respect to the determined correlation and each new contact sorted into the remaining contact list.

8. A computer-implemented system for optimizing campaigns comprising
    a campaign optimizer comprising executable instructions operable to communicate with one or more contact data stores, the data stores associated with at least one of one or more completed contacts and one or more non completed contacts, the campaign optimizer operable to receive completed contacts at adjustable time intervals;
    a correlator comprising executable instructions operable to communicate with the campaign optimizer, to receive the completed contacts, and to determine if a correlation associated with the completed contacts exist between the completed contacts identified with at least one of a success factor and a failure factor and one or more demographic attributes, and wherein the correlator determines the correlation during each of the adjustable time intervals, the adjustable time intervals representing environmental changes occurring outside a scope of a campaign, and wherein the environmental changes affect the correlation during the adjustable time intervals, the environmental changes related to current events occurring during the campaign, and wherein values associated with the success factor or the failure factor is used for dynamically altering the adjustable time intervals; and
    a non completed contact sorter comprising executable instructions operable to communicate with the correlator, one or more of the data stores, and the campaign optimizer, the non completed contacts sorter operable to sort non completed contacts in one or more of the data stores based on the correlation; and using said determined correlation to for optimizing said campaigns.

9. The system of claim 8, wherein the correlator is operable to determine a correlation coefficient for each of the demographic attributes.

10. The system of claim 8, wherein the contacts are associated with an outbound contact campaign.

11. The system of claim 8, further comprising:
    an outcome analyzer comprising executable instructions operable to determine upon completion of one or more of the completed contacts if the completed contact is associated with at least one of the success factor and the failure factor.

12. The system of claim 8, further comprising an optimization manager comprising executable instructions operable to randomly seed the non completed contacts in one or more of the data stores with a percentage of non completed contacts without regard to the correlation.

13. The system of claim 12, wherein the optimization manager is operable to communicate with the correlator to redetermine a modified correlation based on completed contacts associated with the randomly seeded contacts.

14. The system of claim 13, wherein the optimization manager is operable to communicate to the non completed contacts sorter the modified correlation resulting in a resort of the non completed contacts in one or more of the data stores based on the modified correlation.

15. A computer-implemented system for optimizing a contact list during a campaign, using said computer to perform the steps comprising
    identifying a contact campaign;
    receiving a contact list including completed contacts and non completed contacts, each of the contacts associated with a success factor, a failure factor, and one or more demographic attributes;

determining during the contact campaign at adjustable time intervals a correlation between the factors and one or more of the demographic attributes of the completed contacts, wherein the adjustable time intervals are associated with environmental changes occurring outside a scope of the contact campaign, and wherein the environmental changes affect the correlation during the adjustable time intervals, the environment changes related to current events occurring during the contact campaign, and wherein values associated with the success factor or failure factor is used for dynamically modifying the adjustable time intervals;

reordering during the contact campaign the non completed contacts based on the correlation using said determined correlation for optimizing said contact list during the campaign.

16. The method of claim 15, further comprising:

seeding in random order an adjustable percentage of the non completed contacts without regard for the correlation.

17. The method of claim 16, further comprising:

determining a new correlation by evaluating the factors and one or more of the demographic attributes for completed contacts after the seeding step; and reordering the non completed contacts based on the new correlation.

18. The method of claim 15, further comprising:

receiving a reference operable to modify and retrieve one or more contact data records from one or more data stores associated with each of the contacts.

19. The method of claim 15, further comprising:

reporting summary data associated with the contact campaign.

20. The method of claim 15, wherein the contact campaign is conducted over at least one of an e-mail channel, an on-line channel, a voice channel, a video channel, an audio channel, a kiosk channel, an ATM channel, and a wireless channel.

* * * * *